United States Patent
Felip Leon et al.

(10) Patent No.: US 12,162,156 B2
(45) Date of Patent: Dec. 10, 2024

(54) ROBOTIC MANIPULATION PLANNING BASED ON PROBALISTIC ELASTOPLASTIC DEFORMATION MATERIAL POINT METHOD

(71) Applicant: Intel Corporation, Santa Clara, CA (US)

(72) Inventors: Javier Felip Leon, Hillsboro, OR (US); Ignacio Alvarez, Portland, OR (US); Maria Soledad Elli, Hillsboro, OR (US); David Gonzalez-Aguirre, Hillsboro, OR (US); Javier Turek, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 17/133,069

(22) Filed: Dec. 23, 2020

(65) Prior Publication Data
US 2021/0299866 A1 Sep. 30, 2021

(51) Int. Cl.
*B25J 9/16* (2006.01)
*B25J 9/00* (2006.01)

(52) U.S. Cl.
CPC .......... *B25J 9/1661* (2013.01); *B25J 9/0084* (2013.01); *B25J 9/1612* (2013.01); *B25J 9/1697* (2013.01); *G05B 2219/39543* (2013.01); *G05B 2219/40023* (2013.01); *G05B 2219/40577* (2013.01)

(58) Field of Classification Search
CPC ...... B25J 9/1661; B25J 9/0084; B25J 9/1612; B25J 9/1697; G05B 2219/39543; G05B 2219/40023; G05B 2219/40577
See application file for complete search history.

(56) References Cited

U.S. PATENT DOCUMENTS

| | | | | |
|---|---|---|---|---|
| 11,701,771 | B2* | 7/2023 | Mousavian | G06N 3/063 700/245 |
| 2007/0239409 | A1* | 10/2007 | Alan | G06F 30/23 703/2 |
| 2013/0187930 | A1* | 7/2013 | Millman | G06T 19/00 345/473 |
| 2019/0143521 | A1* | 5/2019 | Gawlik | G07C 3/08 702/81 |
| 2019/0240843 | A1* | 8/2019 | Pan | B25J 9/1653 |
| 2020/0086483 | A1* | 3/2020 | Li | B25J 9/1653 |
| 2020/0094415 | A1* | 3/2020 | Xi | B25J 9/1612 |
| 2020/0327203 | A1* | 10/2020 | Storey | G06F 30/20 |

(Continued)

OTHER PUBLICATIONS

ArXIV:1603.02038v1, title: Unscented Bayesian optimization for safe robot grasping; Author: Jose Nogueira (Year: 2016).*

(Continued)

*Primary Examiner* — Sohana Tanju Khayer
(74) *Attorney, Agent, or Firm* — Banner & Witcoff Ltd.

(57) ABSTRACT

A robotic manipulation planning system, including at least one processor; and a non-transitory computer-readable storage medium including instructions that, when executed by the at least one processor, cause the at least one processor to: process perception data to detect known, familiar, and unknown objects to generate manipulation candidates; filter manipulation candidates against constraints to reduce the manipulation candidates; and determine quality metrics for the reduced manipulation candidates using a soft-body simulation technique.

23 Claims, 8 Drawing Sheets

200B
Perception results overlaid on top of input image 200A

(56) References Cited

U.S. PATENT DOCUMENTS

| | | | | |
|---|---|---|---|---|
| 2020/0368616 A1* | 11/2020 | Delamont | ............ | H04N 13/239 |
| 2021/0122039 A1* | 4/2021 | Su | ............ | B25J 13/084 |
| 2021/0260766 A1* | 8/2021 | Patil | ............ | B25J 15/0014 |
| 2022/0044441 A1* | 2/2022 | Kalra | ............ | G06V 10/774 |
| 2022/0258355 A1* | 8/2022 | Drumwright | ............ | B25J 9/1633 |
| 2023/0341851 A1* | 10/2023 | Liu | ............ | G05D 1/0044 |

OTHER PUBLICATIONS

Sulsky, D.; Chen, Z.; Schreyer, H. L. (1994). "A particle method for history-dependent materials". Computer Methods in Applied Mechanics and Engineering. 118 (1): 179-196. doi: 10.1016/0045-7825(94)90112-0. ISSN 0045-7825.

M. Shibata and S. Hirai, "Soft object manipulation by simultaneous control of motion and deformation," Proceedings 2006 IEEE International Conference on Robotics and Automation, 2006. ICRA 2006., Orlando, FL, 2006, pp. 2460-2465, doi: 10.1109/ROBOT.2006.1642071.

M. Ciocarlie et al. "The velo gripper: A versatile single-actuator design for enveloping parallel and fingertip grasps" Int. J. Robot. Res. vol. 33 No. 5 pp. 753-767 2014.

Chen, W., Shi, Y., Yan, H. et al. A stochastic material point method for probabilistic dynamics and reliability. Comput Mech 63, 1069-1082 (2019). https://doi.org/10.1007/s00466-018-1667-5.

Andrew Miller and Peter K. Allen. "Graspit!: A Versatile Simulator for Robotic Grasping". IEEE Robotics and Automation Magazine, V. 11, No. 4, Dec. 2004. http://www.cs.columbia.edu/~cmatei/graspit/pdf/GraspIt_RA04-complete-system.pdf.

Ten Pas, A., Gualtieri, M., Saenko, K., & Platt, R. (2017). Grasp pose detection in point clouds. The International Journal of Robotics Research, 36(13-14), 1455-1473. https://arxiv.org/abs/1706.09911.

C. D. Santina G. Grioli M. Catalano A. Brando and A. Bicchi "Dexterity augmentation on a synergistic hand: The pisa/iit softhand+" Proc. IEEE Int. Conf. Humanoid Robots pp. 497-503 2015.

A. M. Dollar and R. D. Howe "The highly adaptive sdm hand: Design and performance evaluation" Int. J. Robot. Res. vol. 29 No. 5 pp. 585-597 2010.

R. Deimel and O. Brock "A novel type of compliant and underactuated robotic hand for dexterous grasping" Int. J. Robot. Res. vol. 35 No. 1-3 pp. 161-185 2016.

Chenfanfu Jiang, Craig Schroeder, Andrew Selle, Joseph Teran, and Alexey Stomakhin. 2015. The affine particle-in-cell method. ACM Trans. Graph. 34, 4, Article 51 (Aug. 2015), 10 pages. DOI: https://doi.org/10.1145/2766996.

Joshuah Wolper, Yu Fang, Minchen Li, Jiecong Lu, Ming Gao, and Chenfanfu Jiang. 2019. CD-MPM: continuum damage material point methods for dynamic fracture animation. ACM Trans. Graph. 38, 4, Article 119 (Jul. 2019), 15 pages. DOI: https://doi.org/10.1145/3306346.3322949.

Alexey Stomakhin, Craig Schroeder, Lawrence Chai, Joseph Teran, and Andrew Selle. 2013. A material point method for snow simulation. ACM Trans. Graph. 32, 4, Article 102 (Jul. 2013), 10 pages. https://www.math.ucla.edu/~jteran/papers/SSCTS13.pdf.

Julier, Simon (2002). "The Scaled Unscented Transformation". Proceedings of the American Control Conference. 6. http://citeseerx.ist.psu.edu/viewdoc/download?doi=10.1.1.46.8404&rep=rep1&type=pdf.

Ioan A. ?ucan, Mark Moll, Lydia E. Kavraki, The Open Motion Planning Library, IEEE Robotics & Automation Magazine, 19(4):72-82, Dec. 2012. https://ompl.kavrakilab.org/IEEE-ram-2012-ompl.pdf.

Rubert, C., Leon, B., Morales, A., & Sancho-Bru, J. (2018). Characterisation of grasp quality metrics. Journal of Intelligent & Robotic Systems, 89(3-4), 319-342. https://link.springer.com/content/pdf/10.1007/s10846-017-0562-1.pdf.

Roa, M.A., Suarez, R.: Grasp quality measures: review and performance. Auton. Robot. pp. 1-24 (2014) http://citeseerx.ist.psu.edu/viewdoc/download?doi=10.1.1.807.686&rep=rep1&type=pdf.

Shahram Izadi, David Kim, Otmar Hilliges, David Molyneaux, Richard Newcombe, Pushmeet Kohli, Jamie Shotton, Steve Hodges, Dustin Freeman, Andrew Davison, and Andrew Fitzgibbon. 2011. KinectFusion: real-time 3D reconstruction and interaction using a moving depth camera. In Proceedings of the 24th annual ACM symposium on User interface software and technology (UIST '11). Association for Computing Machinery, New York, NY, USA, 559-568. DOI: https://doi.org/10.1145/2047196.2047270.

J. Bohg et al., "Mind the gap—robotic grasping under incomplete observation," 2011 IEEE International Conference on Robotics and Automation, Shanghai, 2011, pp. 686-693. https://ieeexplore.ieee.org/abstract/document/5980354.

Y. Xiang, T. Schmidt, V. Narayanan, and D. Fox, "PoseCNN: A Convolutional Neural Network for 6D Object Pose Estimation in Cluttered Scenes," presented at the Robotics: Science and Systems XIV, Jun. 2018, vol. 14, Accessed: Jun. 10, 2020. [Online]. Available: http://www.roboticsproceedings.org/rss14/p19.html.

Aldoma A., Tombari F., Rusu R.B., Vincze M. (2012) OUR-CVFH—Oriented, Unique and Repeatable Clustered Viewpoint Feature Histogram for Object Recognition and 6DOF Pose Estimation. In: Pinz A., Pock T., Bischof H., Leberl F. (eds) Pattern Recognition. DAGM/OAGM 2012. Lecture Notes in Computer Science, vol. 7476. Springer, Berlin, Heidelberg https://vision.deis.unibo.it/fede/papers/dagm12.pdf.

Thomas W. Sederberg and Scott R. Parry. 1986. Free-form deformation of solid geometric models. Siggraph Comput. Graph. 20, 4 (Aug. 1986), 151-160. DOI: https://doi.org/10.1145/15886.15903.

Gostaf, Kirill Pichon, Olivier Pironneau, and François-Xavier Roux. "Finite element analysis of multi-component assemblies: CAD-based domain decomposition". Domain Decomposition Methods in Science and Engineering XXI. Springer, Cham, 2014. 927-935. http://www.ddm.org/DD21/homepage/dd21.inria.fr/pdf/gostafk_contrib.pdf.

\* cited by examiner

FIG 1
Robotic System

FIG 2A

200A
Input image of example household scene with known, familiar and unknown objects.

FIG 2B

200B
Perception results overlaid on top of input image 200A

FIG 3A

300A
Encircled candidates, of the initial manipulation candidates, are removed by broad reachability check

FIG 3B

300B
Encircled candidates removed by direction and angle filter

FIG 3C

300C
Encircled candidates removed by kinematic check

FIG 3D

300D
Encircled candidates not reachable with collision-free path

500A
Initial parameters for PMPM

| PARAMETER | SYMBOL | UNITS | TYPE |
|---|---|---|---|
| POSITION | $x$ | meters | Variable |
| DENSITY | $\rho$ | kg/m^3 | Constant |
| YOUNG MODULUS | $E$ | Pa | Constant |
| PLASTICITY MODULUS | $E^*$ | Pa | Constant |
| POISSON RATIO | $\nu$ | N/A | Constant |
| HARDENING FACTOR | $\xi$ | N/A | Phase dependent |
| LOWER PLASTICITY CLAMPING | $l$ | N/A | Constant |
| UPPER PLASTICITY CLAMPING | $h$ | N/A | Constant |
| WEISSENBERG NUMBER | $W_i$ | N/A | Phase dependent |

FIG 5B

500B
Additional parameters to enable phase-transitioning PMPM

| PARAMETER | SYMBOL | UNITS | TYPE |
|---|---|---|---|
| HEAT CONDUCTIVITY | $\kappa$ | Watts / (meter*Kelvin) | Depends on $\zeta$ and $T$ |
| HEAT CAPACITY | $c$ | Joule/Kelvin | Depends on $\zeta$ and $T$ |
| TEMPERATURE | $T$ | Kelvin | Variable |
| LATENT HEAT | $L$ | Joule/Gram | Constant |
| PHASE | $\zeta$ | $\zeta \in$ (gas, liquid, solid) | Variable |
| TRANSITION HEAT | $U$ | Joule/Gram | Depends on phase transition |

FIG 6

FIGs 7A-D Evolution of quality metric during PMPM simulation

FIG 8

ROBOTIC MANIPULATION PLANNING BASED ON PROBALISTIC ELASTOPLASTIC DEFORMATION MATERIAL POINT METHOD

TECHNICAL FIELD

Aspects described herein generally relate to robotic manipulation planning, and more particularly to robotic manipulation planning based on probabilistic elastoplastic deformation material point method simulation with accompanying quality metrics.

BACKGROUND

Robots in typical industrial scenarios perform manipulation tasks that are pre-programmed in that position, material, and models of all objects in an environment are known and engineered beforehand. The robots and objects are caged in a controlled cell to avoid any external perturbation changing the state of the objects and interrupting a sequence of actions. The limited ability of typical robotic manipulation planning to deal with unstructured and uncertain environments prevents wider adoption of robotic solutions.

DESCRIPTION OF THE ASPECTS

Overview

A robotic manipulation process is generally divided into four phases: environment and object perception; manipulation planning; motion planning; and reactive control. Each of these phases involves managing uncertainty arising from perception, modelling errors, and execution. The aspect of this disclosure focus on the manipulation planning aspect, which includes determining a position a robot needs to reach in order to proceed with a manipulation action (e.g., push, pull, grasp, etc.). Typical robotic manipulation planning approaches rely on rigid or articulated object kinematics to determine both manipulation position candidates and quality metrics that determine a most suitable set of actions. These approaches may provide misleading outcomes for objects that are non-rigid, leading manipulation process failures.

Aspects disclosed herein are an improvement on the typical robotic manipulation process by using a probabilistic material point method (PMPM) approach for soft-body simulation, and the exploitation of such soft-body dynamics to drive robotic manipulation planning through expanded quality metrics.

Figure 1:
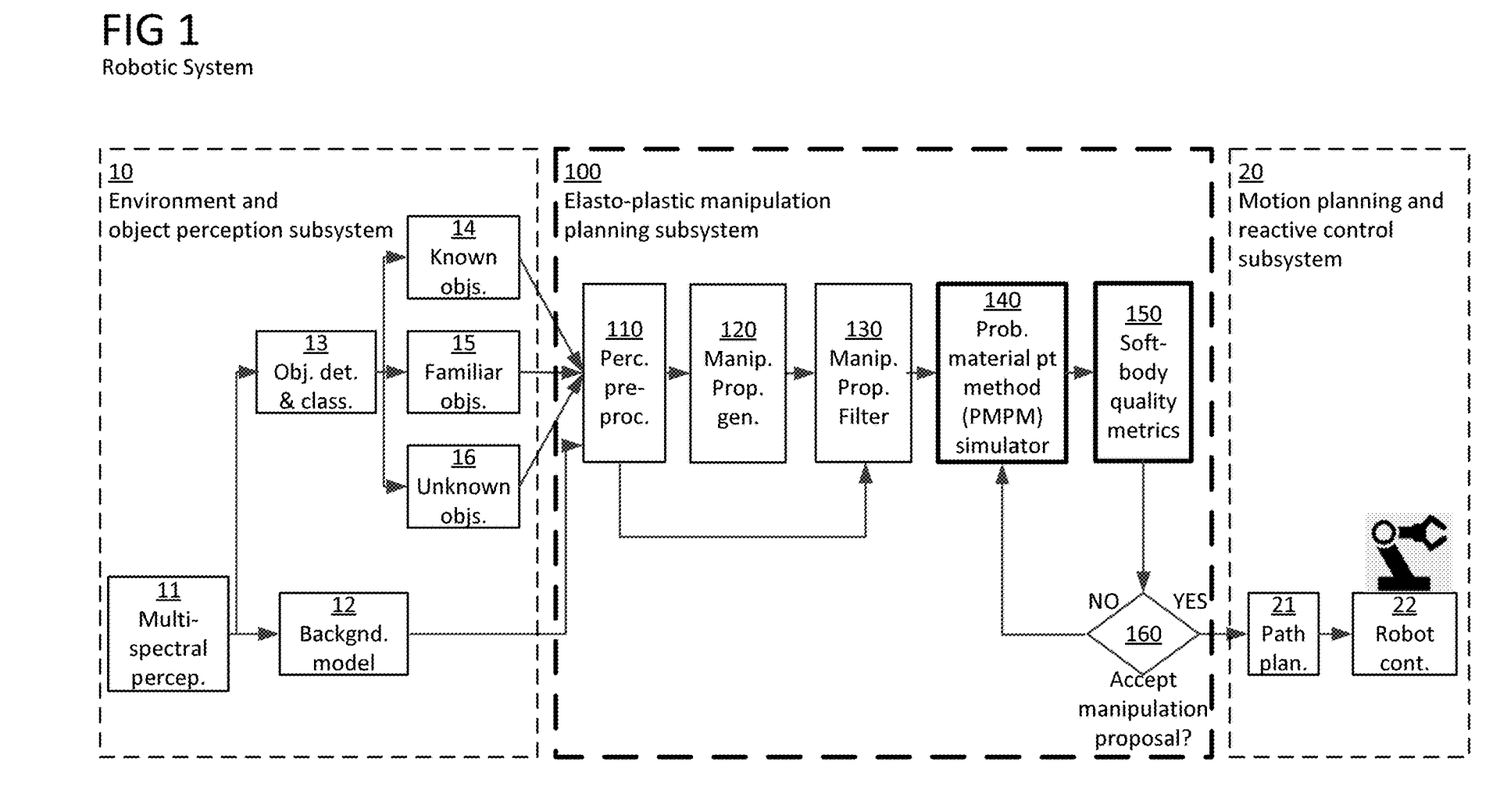
FIG. 1 is a block diagram illustrating elastoplastic manipulation planning subsystem within a robotic manipulation system.

FIG. 1 is a block diagram illustrating elastoplastic manipulation planning subsystem 100 within a robotic system.

The robotic system comprises an environment and object perception subsystem 10, an elastoplastic manipulation planning subsystem 100, and a motion planning and reactive control subsystem 20.

The environment and object perception subsystem 10 estimates the geometry and material properties of detected objects in a scene. The scene representation is used by the elastoplastic manipulation planning subsystem 100 to generate a suitable manipulation strategy that considers the soft-body dynamics of the scene. Finally, the manipulation strategy is used by the motion planning and reactive control subsystem 20, which generates a motion plan and supervises its execution through reactive control.

The object perception subsystem 10 and the reactive control subsystem 20 are typical subsystems provided to place the elastoplastic manipulation planning subsystem 100 in context. For sake of conciseness, the descriptions of the object perception subsystem 10 and the reactive control subsystem 20 are included but brief.

I. Environment and Object Perception Subsystem 10

The environment and object perception subsystem 10 comprises a multi-spectral perception subsystem 11, a background model 12, an object detection and classification module 13, and lists of objects detected.

The multi-spectral perception subsystem (e.g., cameras, LIDAR, SONAR, RADAR, etc.) are enhanced with multi-spectral sensing capabilities better suited for material detection and friction coefficient estimation. The multi-spectral perception subsystem 11 senses the scene material properties and geometry required for soft-body simulation. Then, sensed data is classified by the object detection and classification module 13 as known objects 14, familiar objects 15, and unknown/background 16. Known type-specific state estimation algorithms are used for each of these object classifications.

Figure 2A:
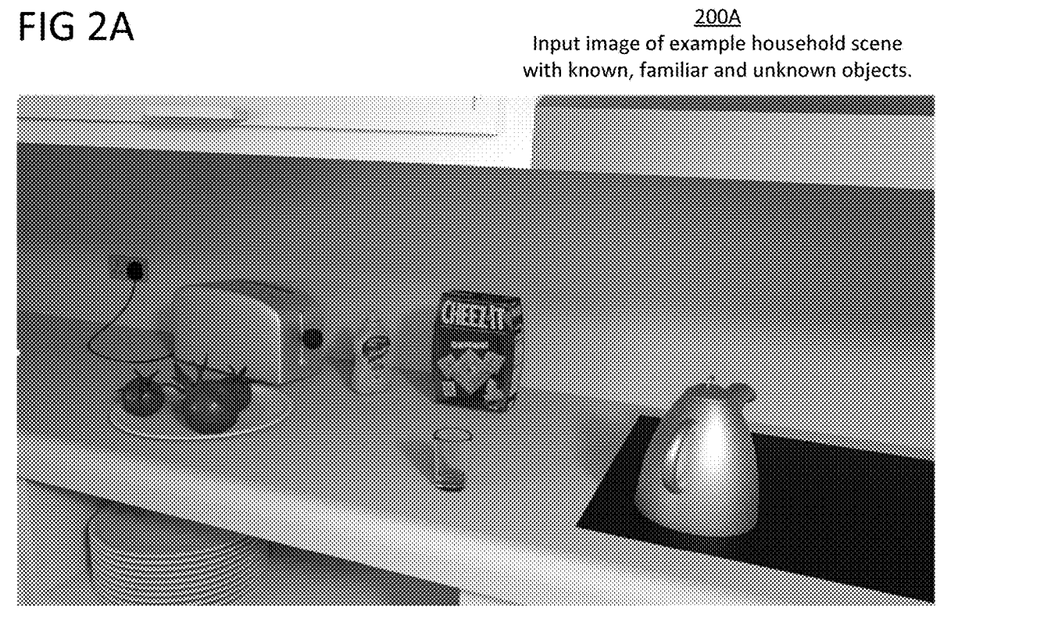
FIGS. 2A-2B illustrate an example image of a household scene.
Figure 2B:
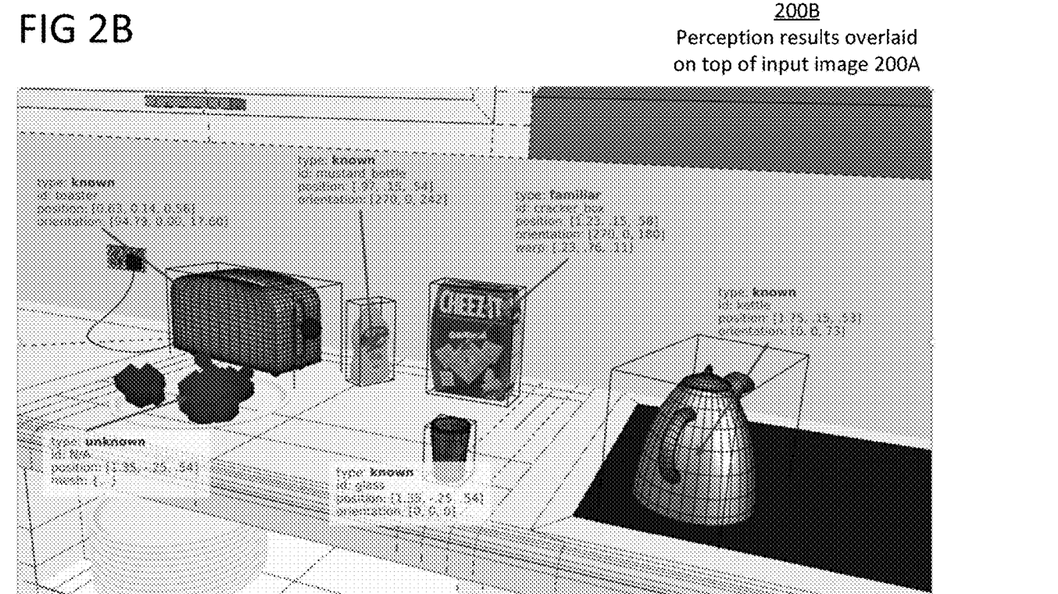

FIGS. 2A-2B illustrate an example image of a household scene 200 with known, familiar and unknown objects. FIG. 2A illustrates an input scene image. FIG. 2B illustrates perception results overlaid on top of the input scene image.

The objects have different material and deformation properties that are to be estimated by the perception subsystem 10 or available in the known and familiar models. FIG. 2B illustrates the different object types detected and their corresponding parameterizations.

The household scene 200 comprises background 12, unknown objects 16, familiar objects 15, and known objects 14. For each class of input data, existing methods may be used.

The background 12 is reconstructed using existing mesh reconstruction methods. The unknown objects 16 may be modelled with known approaches that assume symmetries. This enables approximate models of unknown objects 16 that can be used for manipulation planning. The familiar objects 15 may be modeled with known approaches involving simultaneous warping and six degrees of freedom (6DoF) familiar object pose estimation algorithms. The known objects 14 may be modelled with existing approaches for pose estimation and object identification.

Known modeling approaches provide a different representation of objects and environments, which are then transformed into a common representation, as discussed in detail below in Section IIA "Perception Pre-Processing Module." This perception is also able to detect the material using multispectral sensors or, for known objects, acquire the material properties from a database. The methods used for object detection, modelling, and material property detection provide uncertainty metrics, which can be achieved with Bayesian Neural Networks and/or Approximate Bayesian Inference, for example.

II. Elastoplastic Manipulation Planning Subsystem 100

After the scene is acquired through the sensing mechanisms and modelled in the environment and object perception subsystem 10, the model is subjected to a probabilistic material point methods (PMPM).

PMPM is an extension of existing MPMs, and is used for probabilistic soft-body simulation in the loop of the elastoplastic manipulation planning subsystem 100 in accordance with aspects of the disclosure. The manipulation planning subsystem 100 iteratively computes desired manipulation pose candidates (robot joint values), simulates the physical interaction using PMPM, and determines the pose candidate manipulation quality metric. This process is repeated until successful quality metrics are obtained. Due to the probabilistic nature of the PMPM method, multiple manipulation planning loops may be performed in parallel, thereby obtaining multiple samples of the planning process used to compose a distribution over plans.

These plans are then analyzed to execute the plan with highest expected quality metric, and also to consider replanning if the uncertainty of the resulting quality metrics is deemed excessive.

The elastoplastic manipulation planning subsystem 100 comprises a perception pre-processing module 110, a manipulation proposal generator 120, a manipulation proposal filter 130, a PMPM simulator 140, a soft-body metrics module 150, and a decision module 160.

IIA. Perception Pre-Processing Module 110

The perception pre-processing module 110, as is known, is configured to process sensor information and provide the results in multiple representations FIGS. 2A-2B show an example of an image of a household scene. The input from the perception pre-processing module 110 includes objects lists comprising a known objects list 14 ([lid, pose]), a familiar objects list 15 ([lid, pose, warp field]), an unknown objects list 16 ([mesh, pose, material]). The input also includes actions comprising action type (e.g., push, pull, grasp, or place), action constraints (e.g., top, side, etc.), and action objects (list [id]).

Known objects 14 are provided as a computer aided design (CAD) model, a 6DoF transformation, and its uncertainty. Familiar objects 15 are also represented as known objects, along with an additional shape deformation function that is used to morph the canonical CAD model into the perceived object geometry. Unknown objects 16 and background 12 are represented by a point cloud representation that includes estimated point-wise material properties. The role of the pre-processing module 110 is to convert the different representations to a common representation that is suitable to be used by the manipulation proposal generator 120 and subsequently by the PMPM simulator 140. Consequently, a point-based representation is used, and the different object and background representations are converted as follows.

Known and familiar objects 14, 15 are represented by meshes. Meshes may be converted to points by taking their vertices, however this might result into sparse representation that will break the continuity of the object. Therefore, object meshes are subsampled or super-sampled according to the local curvature of the mesh to obtain a dense volumetric representation, using a uniform grid of configurable resolution. To avoid aliasing, points that belong to the surface are projected to the mesh, while internal points are kept regular. Finer grids provide increased accuracy at a larger computational cost. The resulting points are endowed with material properties that depend on the neighboring vertices. This dependence may be implemented as a nearest neighbor, radial-basis interpolation, or other similar method. The simulation approaches used are based on point methods, and are not impacted by discretization problems that arise in other known finite element analysis techniques.

Unknown objects 16 are represented by a point cloud with point-wise material properties. However, the point density might not be similar to the required density expected by the simulation method, and thus, subsampling or interpolation is used to obtain the desired point density. Self-occlusions have shown to be tackled by approximating the unseen face of the object assuming symmetries.

Background 12 and static objects are not considered for the manipulation candidate generation and may be included in the PMPM simulation as static constraints. Therefore for these detections, the pre-processing consists of its removal for the manipulation proposal generator input, or on its static obstacle definition for the PMPM simulation.

IIB. Manipulation Proposal Generator 120

The manipulation proposal generator 120 are generally neural-network-based approaches that use volumetric representations to compute grasping candidates. Such generators are known, and of the sake of brevity, will not be described in detail here.

IIC. Manipulation Proposal Filter 130

FIGS. 3A-3D illustrate an example of manipulation candidate filtering 300 of the household scene 200 performed by the manipulation proposal filter 130.

As can be seen in the figures, the manipulation proposal generator 120 proposes a plurality of candidate manipulations. However, many of these proposals are unlikely to be accepted because they will fail to satisfy fundamental constraints. This manipulation proposal filter 130 implements a sequence of constraint checks that run sequentially, discarding in advance proposals that should not be considered. The filtering results in a savings in the computationally expensive task of running as many soft-body simulations to compute the manipulation quality metrics that are used to decide which proposal to accept. Without filtering the soft-body simulation would be evaluated for every proposal, wasting computational resources and making the proposed approach intractable for real applications.

The computational complexity of each constraint check differs. The constraint check sequence is preferably ordered from faster to slower. This reduces the number of candidates that have to be processed by more complex constraint check algorithms. A preferable constraint check order is broad reachability, direction and angle, kinematically reachable, and then dynamically reachable. Broad reachability constraint check checks if the proposal is inside the workspace. The direction and angle constraint check checks if the proposal direction is close enough to the constrained manipulation direction. The kinematically reachable constraint check runs an inverse kinematics solver to check if the proposal pose can be reached by the manipulator. And the dynamically reachable constraint check checks if it is possible to reach the proposed manipulation pose with the current scene and manipulator configuration; this can be achieved by running a path planning algorithm that generates the sequence of actions to move the manipulator end effector to the proposed pose while avoiding collisions with the environment. This can be achieved using well known algorithms.

Figure 3A:
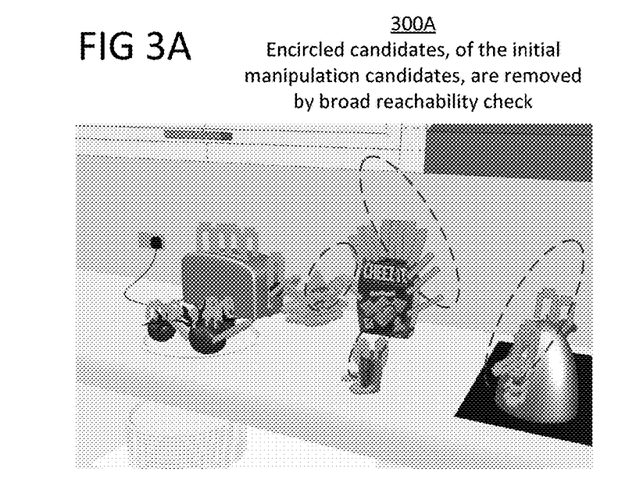
FIGS. 3A-3D illustrate an example of manipulation candidate generation and filtering.

FIG. 3A shows the initial manipulation candidates generated by the manipulation proposal generator 130. Encircled portions of the image highlight the candidates to be removed by the broad reachability constraint check.

Figure 3B:
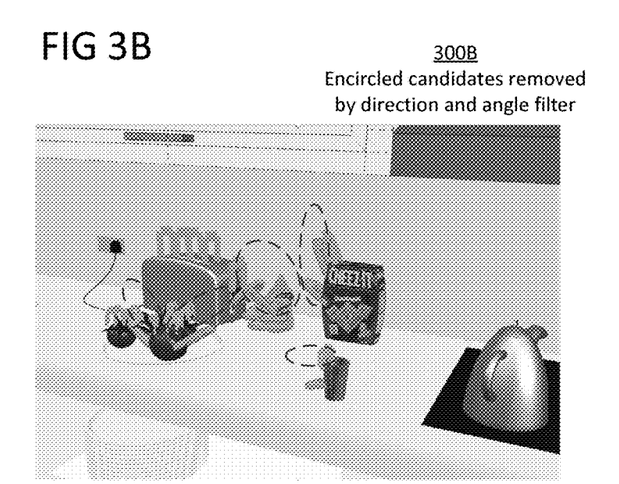

FIG. 3B shows encircled portion representing the candidates to be removed by the direction and angle constraint check. Constraining the manipulation to be a top grasp, all grasp candidates that do no approach objects from the top are removed.

Figure 3C:
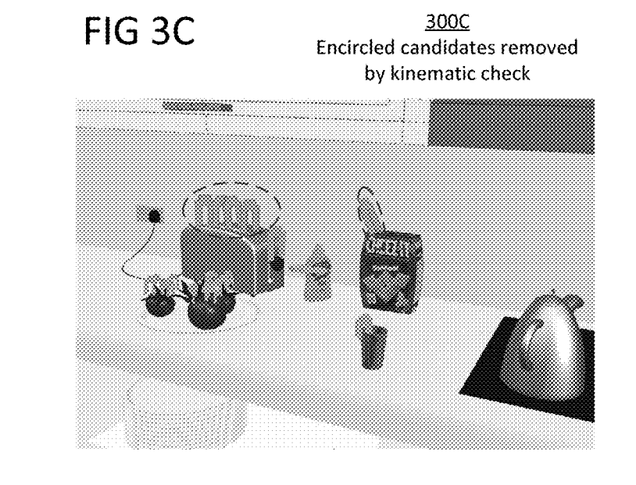

FIG. 3C shows encircled portion representing candidates removed by the kinematic constraint check. Robot arm positions that reach the grasp candidates that are encircled are in kinematic collision with the environment. In this example, the arm positions that reach outlined candidates are in collision with the drawer.

Figure 3D:
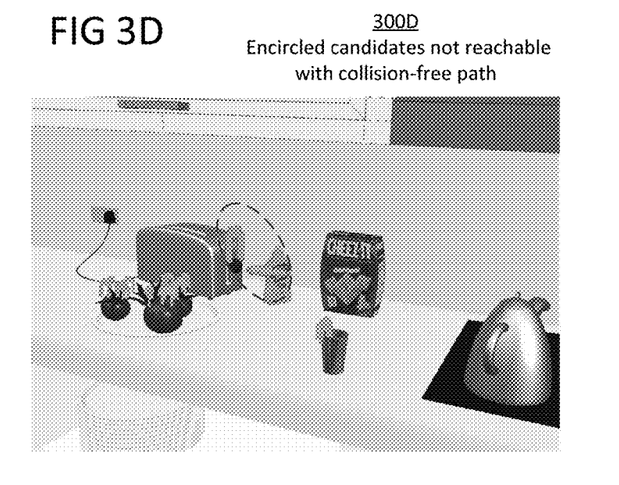

FIG. 3D shows encircled portions representing candidates that are not reachable with a collision-free path from the current robot position. For example, the grasp candidate on the mustard bottle requires the arm to reach a pose that needs to navigate between the tomatoes and the toaster. Although it is kinematically feasible, the path planner cannot find a trajectory that allows the arm to move from the current position to the desired position.

IID. Probabilistic Material Point Method (PMPM)

MPM are a set of soft-body simulation techniques that have been widely used in multiple domains such as animated movies, fluid dynamics, solid mechanics, etc. MPMs are a hybrid soft body in that they possess features from point methods and mesh methods. Object geometries are represented by a set of points, which are used to determine material properties and geometry. In contrast, the dynamics calculations regarding velocity, momentum, heat transfer etc. are computed using a mesh that is regenerated for every simulation step depending on the point positions.

Figure 4:
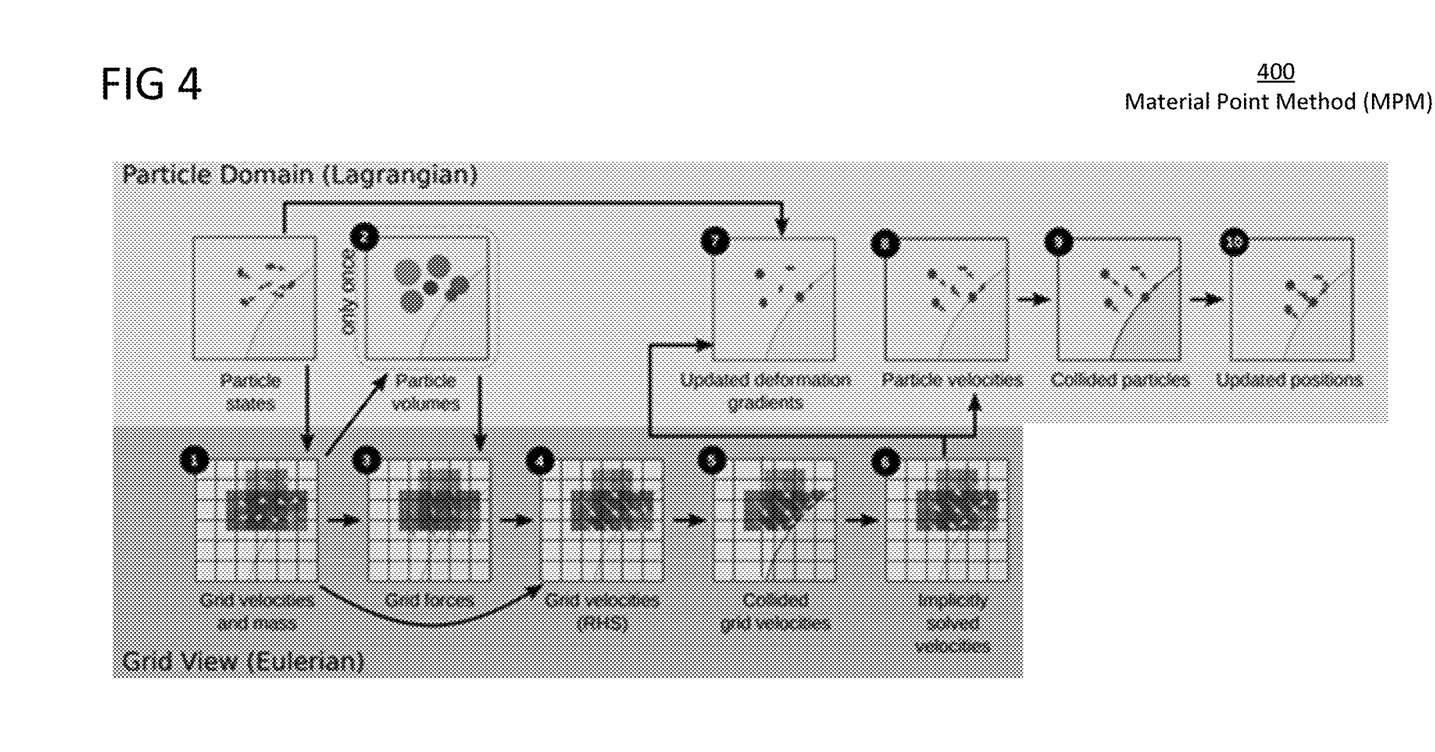
FIG. 4 illustrate a typical material point method (MPM).

Byway of background, FIG. 4 illustrates a known MPM 400 for simulating the behavior of solids, liquids, gases, and any other continuum material. A continuum body is described by a number of Lagrangian elements referred to as "material points" or "particle data". These material points are surrounded by a background mesh/grid that is used only to calculate gradient terms, such as the deformation gradient.

The MPM's step ① rasterizes particle data to the Eulerian grid, but only at the first step. Each particle contains the position, velocity, mass, and deformation gradient. Step ②, which is also only performed at the first step, computes particle volumes and densities. Step ③ computes grid forces by calculating the Cauchy stress for all grid nodes. Step ④ updates velocities on the grid. Step ⑤ calculates grid-based body collisions. Step ⑥ solves the linear system to deform the grid. Step ⑦ updates the deformation gradient. Step ⑧ updates particle velocities. Step ⑨ calculates particle-based body collisions. And step ⑩ updates particle positions.

The PMPM of this disclosure relaxes the assumption that the object shape and material parameters are known. Instead, their values are modeled as random variables distributed by a probability density function. The parameters that each particle carries depend on the underlying MPM being used. Each particle has a set of parameters that is modelled by random variables (RVs) in the PMPM formulation.

Figure 5A:
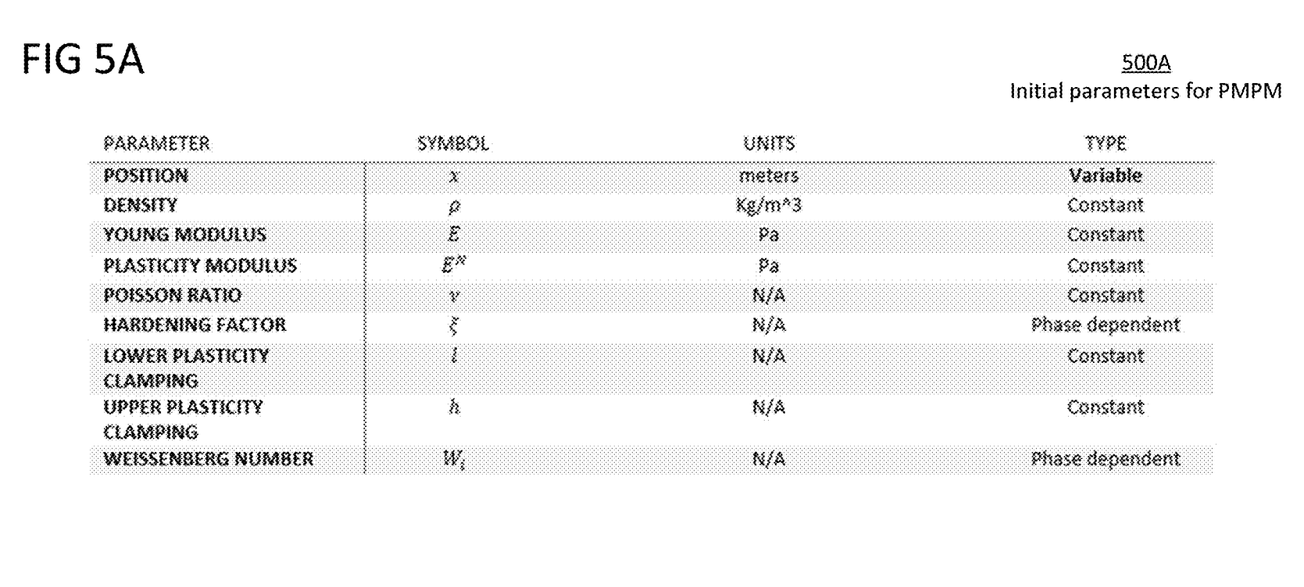
FIGS. 5A-5B illustrate parameter tables for probabilistic material point method (PMPM) simulation in accordance with aspects of the disclosure.
Figure 5B:
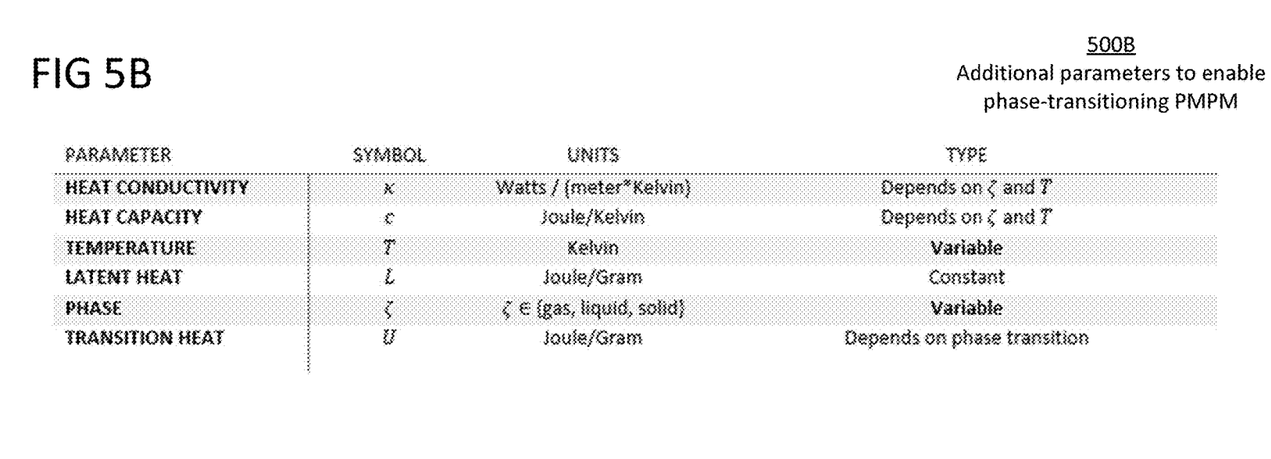

FIGS. 5A-5B illustrate parameter tables 500 for MPM soft-body simulation in accordance with aspects of the disclosure. FIG. 5A shows a table 500A listing initial parameters required for the PMPM soft-body simulation. Each of the parameters can be constant, variable, or alternatively, dependent on another parameter. The PMPM simulation can be extended to enable phase-transitioning materials simulation (i.e., gas-liquid-solid), which increases the complexity of the model and adds the parameters shown in Table 500B of FIG. 5B. The inclusion of this capability increases the computational cost. Therefore, this extension is preferably used only when the model requires to reflect the effects of heat in the material properties.

Figure 6:
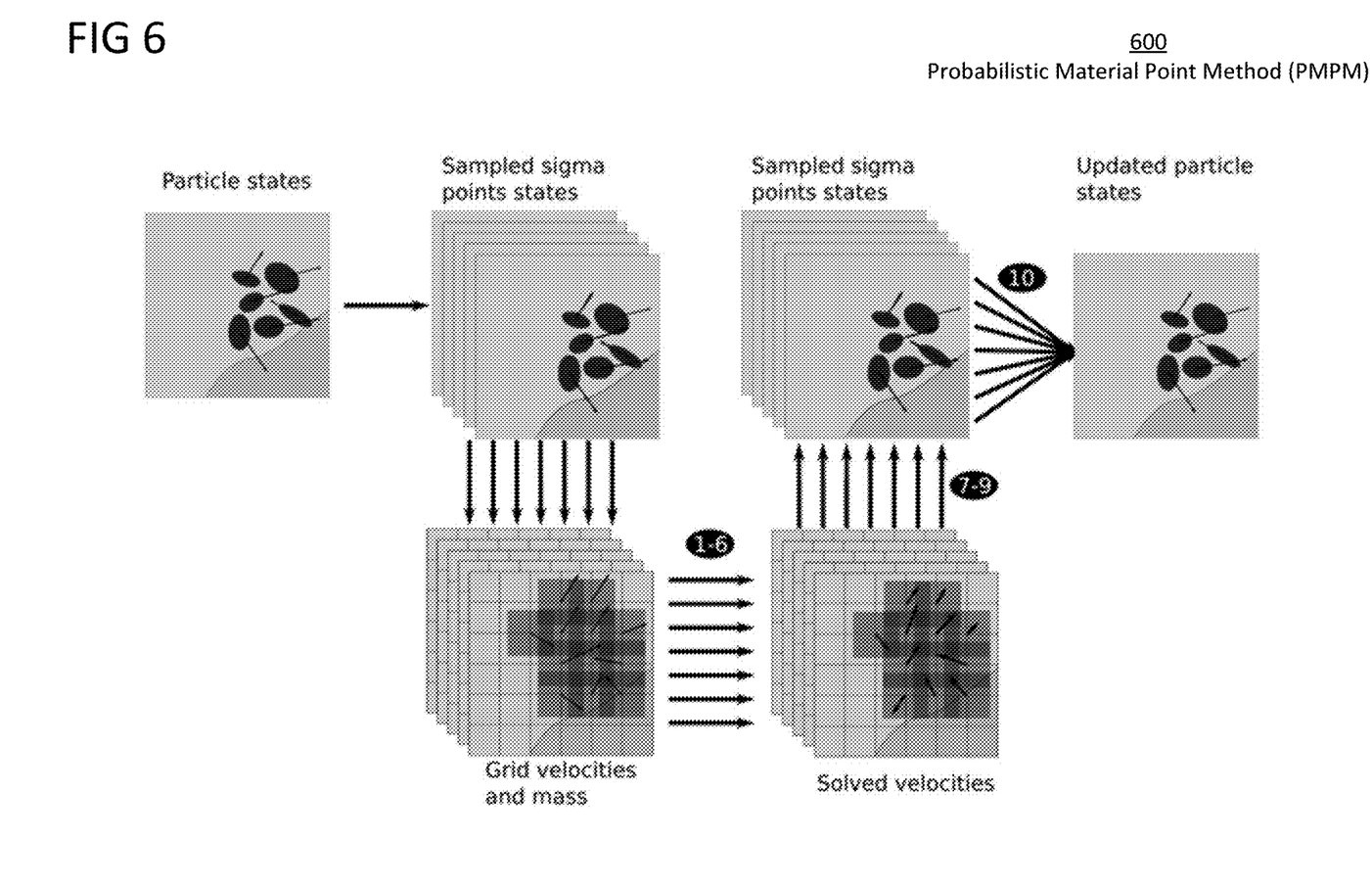
FIG. 6 illustrates a PMPM in accordance with aspects of the disclosure.

FIG. 6 illustrates the PMPM 600 in accordance with aspects of the disclosure.

During simulation, particle positions are no longer known quantities, as in MPM, but are instead represented by continuous random variables. For each random variable that varies over time (i.e., labeled as variable in the type column of tables 500A and 500B), the algorithm keeps track and propagates its probability density function (PDF), which may also be referred to as the "belief." Each update step from the MPM algorithm uses an unscented time integration (UTI) instead of an existing time integration method. In this manner, it is possible to propagate the belief of the position of each particle while also taking into consideration the uncertainty in the material parameters, the LaGrange state (i.e., particle positions and velocities), and the Eulerian state (i.e., grid velocities and deformation gradients). Therefore, the unscented time integration does not happen at a single step, but is a result of the different sequences of non-linear operations that are performed as part of the PMPM simulation process.

By way of overview. The PMPM 600 has steps analogous to the MPM described above with respect to FIG. 4, that is, steps ①-⑥ performed on the grid, and steps ⑦-⑨ performed in the particle space. The PMPM 600 before these steps, the discretization step spawns K+1 simulations by sampled sigma points of the probability density function distributing random variables modeling object material parameters. The sigma points are propagated through the object model by performing steps ①-⑨ and the results are aggregated to update the probability density function.

More specifically, the first PMPM step ① rasterizes particles to the grid. The state of each particle is transferred to the grid, wherein the state of each particle is represented as:

$$p=\{x_p\in \mathbb{R}^3, v_p\in \mathbb{R}R^3, m_p\in \mathbb{R}^3, F_p\in \mathbb{R}^3\}\in P, \quad \text{(Equation 1)}$$

with $\mathbb{R}^3$ being a vector of three real-valued components (i.e., three-dimensional space), x representing position, v representing velocity, m representing mass, and F representing force. In known MPMs a weighting function $w_i$ is used to transfer the state from particles to the grid. In PMPM, however, the state of each particle is probabilistic and represented by a probability density function. A joint probability density function with dimensionality:

$$K=P*N \quad \text{(Equation 2)}$$

is constructed in order to sample the sigma points for the unscented integration update, as described below in Section IID-1 "Unscented Time Integration Update." K+1 sigma points symmetrically distributed about the mean are obtained, with the "+1" sigma point being the mean, resulting in K+1 different states to be simulated. N represents the number of parameters required to define the state of a point.

Step ② computes particle volume and density. This step is only on done in the first iteration. Step ③ computes grid forces. This step depends on the volume, grid weighting function and the Cauchy stress, which is computed with the deformation gradients and the elastoplastic material properties. Step ④ updates grid velocities. Step ⑤ calculates grid-based collisions. Step ⑥ solves explicit time integration. Step ⑦ updates particle deformation gradient from the grid-based velocities. Step ⑧ updates particle velocities from the grid-based velocities. Step ⑨ calculates particle-based collisions, that is, updates particle velocities to account for collisions. Step ⑩ updates particle positions, velocities, and deformations. This is accomplished by collapsing the final sigma points to form the updated belief, as described in detail below in Section IID-1 "Unscented Time Integration Update." The method then continues to the next time-step.

The intermediate steps from ②-⑧ are computed for each sigma point concurrently. With enough parallelism and computational power, the increased computation requirement can be absorbed by an equal scaling of computational parallelism and memory, not necessarily increasing the time required for the processing of the PMPM compared to the existing MPM.

IID-1. Unscented Time Integration Update

The motion that governs the evolution of position is a nonlinear function of the particle positions, mesh velocities, material properties, and other contact, friction, and temperature constraints. The propagation of the particle belief needs to consider such a nonlinear transform. These can be approximated by computing the unscented transform of the beliefs, which involves applying the non-linear transformation to a set of strategically sampled sigma points that are obtained depending on the current belief (probability density function) and the remaining random variables of the material properties, as shown in FIG. 6. Therefore, the time integration step is computed independently and in parallel for each sigma point, and the results are used to construct the new belief estimate.

Depending on the parametric distribution used to represent each of the components of the particle state information, a different formula should be applied to compute the moments of the probability density function. An example is to use normal distributions to represent variables that can have positive and negative values (e.g., position and velocities), gamma distributions for material properties and constants that must be non-negative, and Epanechnikov kernels for variables with limited support. For example, the Poisson ratio that describes the expansion or contraction of a material in directions perpendicular to the direction of loading, must be in the [−1, 0.5] interval. In the case we are considering, not only position is expressed by PDFs, therefore the sigma points are computed over the joint distribution of all the random variables used in the simulation (assuming independence). This way the result considers the uncertainty over the material parameters as well to compute the updated belief (probability density function).

IIE. Soft-Body Quality Metrics Module 150

FIGS. 7A-7D are images illustrating an evolution 700 of a quality metric during a PMPM simulation in accordance with aspects of the disclosure.

The soft-body quality metrics module 150 in accordance with aspects of this disclosure extend existing approaches. The extension involves adding penalties on the deformation and computing known grasp quality metrics over the final deformed mesh. Additionally, the uncertainty on the simulation process around contact points evaluated is also considered to provide the final manipulation quality score, favoring more certain results over uncertain simulations. First, a manipulation candidate is selected, at random or with some heuristic policy, from the set of candidates obtained after the filtering step described above in Section IIC "Manipulation Proposal Filter."

The selected candidate is used to compute its quality metrics as follows:

First, a PMPM simulation is executed. The simulated manipulation process runs the desired control actions on the simulated robotic manipulator, which applies forces to the object model. The evolution of quantities relevant for quality metrics are stored. FIGS. 7A-7D show an example of an evolution (FIGS. 7A to 7D) of manipulation quality metric for a grasping task during a PMPM simulation involving a deformation of tomato leaves during the grasp. The position of the simulated robotic manipulator shown in FIG. 7A results in a grasp quality Q=0.0, FIG. 7B a grasp quality Q=0.2, FIG. 7C a grasp quality Q=0.7, and FIG. 7D a grasp quality Q=0.5. The normal and tangential forces from the fingers influence the grasp force closure metric, however, the same forces cause a deformation which is also considered in the metric. Thus, FIG. 7C obtains a better score because it satisfies force closure constraints and causes less deformation than FIG. 7D.

Second, quality metrics for each time step are computed using the proposed metrics detailed below in Section IIE-1 "Elastoplastic Manipulation Quality Metric."

Finally, the candidate is accepted or rejected at decision module 160 of FIG. 1, depending on a task-specific manipulation quality threshold. If the candidate is rejected, the algorithm returns to the first step of the PMPM simulator 140. Otherwise, the planning process is completed, and at the decision module 160, an output comprising the selected manipulation candidate with the desired manipulation controller parameters (e.g., initial position, grip force, push/pull force, and motion constraints) is sent to the motion planning and reactive control subsystem 20.

Objects that are more delicate or valuable will require a better manipulation candidate and can allow for extra computation by evaluating more candidates for improved safety. On the other hand, objects that are more compliant and less value is lost if the manipulation process fails can allow a lower threshold reducing the computation required to find a suitable manipulation candidate and increasing the task execution throughput.

IIE-1. Elastoplastic Manipulation Quality Metric

A generic quality metric $\mathcal{F}(o, c_i, T_i)$ is a function of the object model and the contact points and contact forces. The quality metric in accordance with aspects of the disclosure extends existing quality metrics by adding penalty terms on the deformation. The two different types of deformation, that is, plastic and elastic, are penalized differently by tuning their scaling parameters $\alpha_e$ and $\alpha_p$, respectively. The penalty parameters can be tuned depending on the breakability of the object being manipulated and the importance to avoid elastic or plastic deformations. For example, in the tomato grasping case described above, the plastic deformation penalty might be set high to prevent crushing. On the other hand, when grasping a cloth, the plastic deformation will naturally happen as part of the grasping process and should not be penalized excessively. The quality metric Q may be represented as follows:

$$Q(o, c_i, F_p) = \frac{1}{\sum_i S(o, c_i)} \left[ \mathcal{F}(o, c_i) - \alpha_e \sum_{p \in P} |F_{Ep}| - \alpha_p \sum_{p \in P} |F_{Pp}| \right] \quad \text{(Equation 3)}$$

where o represents the object, $c_i$ the contact location, $F_p$ the force, $\mathcal{F}(o, c_i)$ a typical quality metric, $\alpha_e$ the elastic scaling parameter, $|F_{Ep}|$ the magnitude of the elastic force, and $\alpha_p$ the plastic scaling factor, and $|F_{Pp}|$ the magnitude of the plastic force. The uncertainty in the simulation process is incorporated by the term $1/\Sigma_i\, S(o, c_i)$.

Figure 7A:
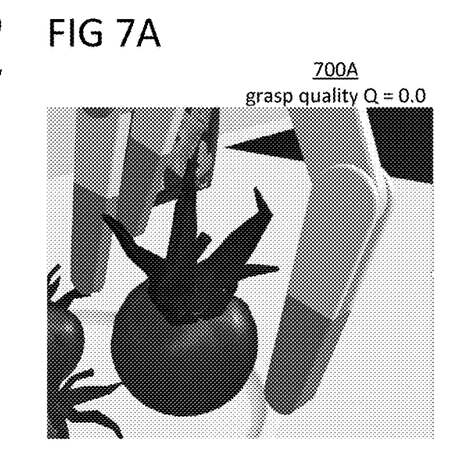
FIGS. 7A-7D are images illustrating an evolution of a quality metric during a PMPM simulation in accordance with aspects of the disclosure.
Figure 7B:
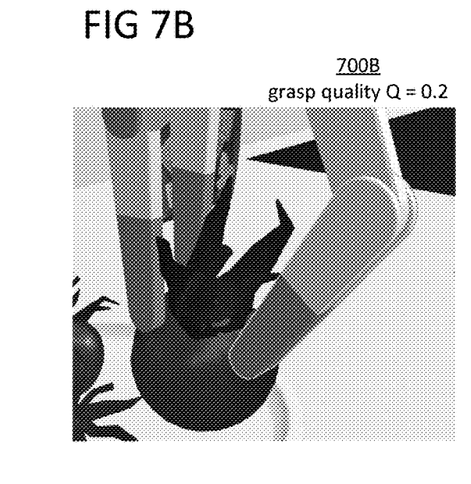
Figure 7C:
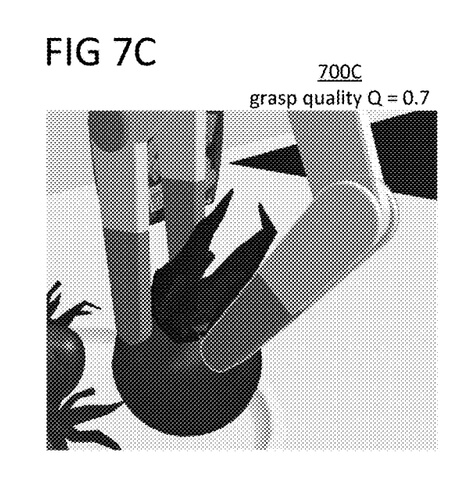
Figure 7D:
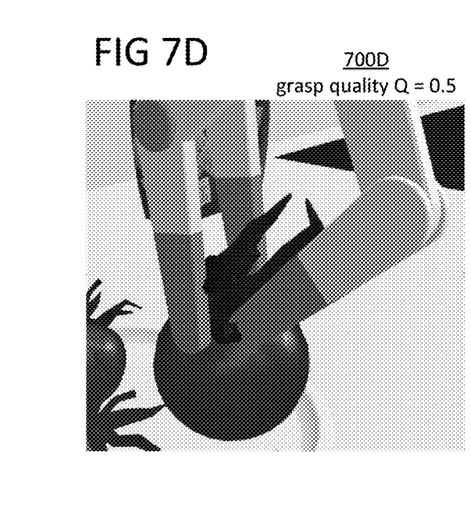

Returning to FIGS. 7A-7D showing the example of the quality metrics obtained during a simulation of a grasping action on the leaves of a tomato, it can be observed how both the forces applied and the deformation influence the resulting quality metric. In FIGS. 7A and 7B, the force is not enough to acquire a good quality grasp. In FIG. 7D, the excessive force does not increase the typical quality metric term $\mathcal{F}(o, c_i)$, but the excessive force further deforms the tomato, increasing the penalty due to elastoplastic deformation. The uncertainty in the simulation process is incorporated by the term $1/\Sigma_i S(o,c_i)$, which weights the obtained manipulation quality metric inversely with respect to the total uncertainty of the predicted mesh around the contact points $c_i$. This may result in lower quality grasps being selected over higher quality grasps, provided the former have less uncertainty about the final object deformation. Current approaches apply quality metrics to the initial mesh configurations of the objects. This prevents the metric from computing the quality after the dynamic interactions of the robot end effector and the object. An important contribution of the quality metrics presented herein is to consider the dynamical deformation as part of the evaluation, aside from penalizing the different types of deformation.

III. Motion Planning and Reactive Control Subsystem 20

Returning to decision module 160 of FIG. 1 where the candidate is accepted or rejected depending on a task-specific manipulation quality threshold, if the candidate is accepted, the planning process is completed, and at the decision module 160, an output comprising the selected manipulation candidate with the desired manipulation controller parameters (e.g., initial position, grip force, push/pull force, and motion constraints) is sent to the path planning module 21 of the motion planning and reactive control subsystem 20. After the path is planned, the robot controller actuator 22 manipulates the robot to execute the planned path in accordance with known methods.

Figure 8:
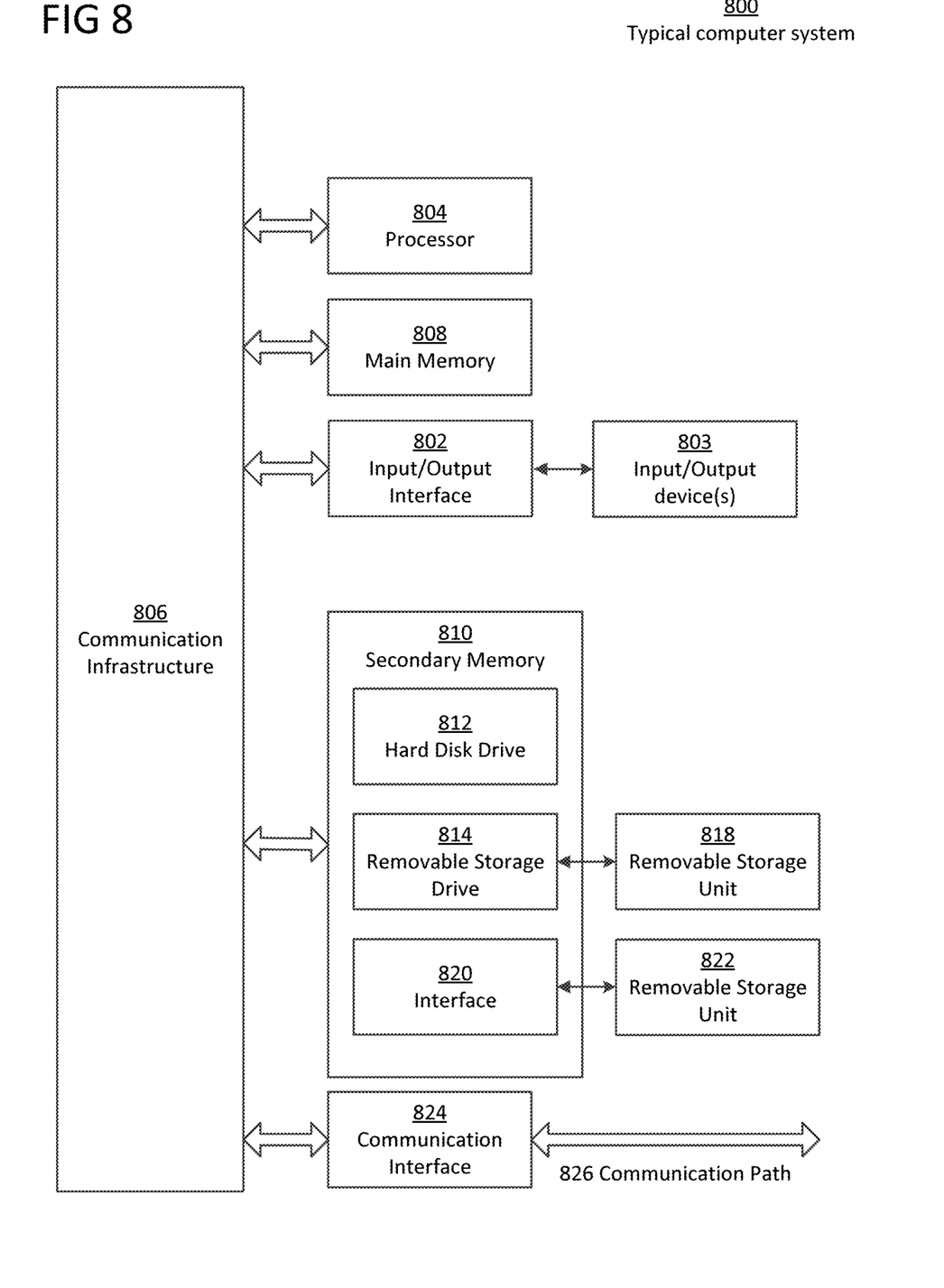
FIG. 8 is a block diagram illustrating a typical computer system for implementing the aspects of the disclosure.

FIG. 8 is a block diagram illustrating a typical computer system 800 for implementing the aspects of the disclosure.

Computer system 800 includes one or more processors (also called central processing units, or CPUs), such as a processor 804. Processor 804 is connected to a communication infrastructure or bus 806.

One or more processors 804 may each be a graphics processing unit (GPU). In an aspect, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 800 also includes user input/output device(s) 803, such as monitors, keyboards, pointing devices, etc., which communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary aspect, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an aspect, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 8. In particular, aspects may operate with software, hardware, and/or operating system implementations other than those described herein.

Aspects of the present disclosure add elastoplastic deformation modelling to the manipulation process, thereby exploiting soft-object material properties. This elastoplastic deformation modelling uses a probabilistic approach on the soft-body parameterization. The manipulation process considers material property uncertainties to better manipulate objects by interacting with regions exposing higher parametric confidence. A result is increased reliability and physical accuracy of the perception-planning process during manipulation execution.

Existing MPMs assume that material parameters are known and thus do not consider the model acquisition uncertainty that real world sensors exhibit. Therefore, their predictions are point estimates and do not convey information about the certainty of the predictions. The probabilistic extension disclosed herein enables the MPM to consider uncertainty in the material parameters and provides predictions with principled uncertainty values that depend both on the complexity of the simulated process and the uncertainty of the estimated model parameters.

The techniques of this disclosure may also be described in the following examples.

Example 1. A robotic manipulation planning system, comprising: at least one processor; and a non-transitory computer-readable storage medium including instructions that, when executed by the at least one processor, cause the at least one processor to: process perception data to detect known, familiar, and unknown objects to generate manipulation candidates; filter manipulation candidates against constraints to reduce the manipulation candidates; and determine quality metrics for the reduced manipulation candidates using a soft-body simulation technique.

Example 2. The system of claim 1, wherein the determining the quality metrics using a soft-body simulation technique comprises: simulating a manipulation action on an object model using a probabilistic material point method (PMPM) based on object material parameters modelled by random variables distributed by a probability density function with sigma points, wherein the sigma points are propagated through the object model to update the probability density function; and determining a quality metric of the simulated manipulation action based on the updated probability density function, wherein the quality metric is a function of an elastoplastic deformation penalty term accounting for deformation of the object model.

Example 3. The system of claim 2, wherein the instructions further to cause the at least one processor to: propagate the sigma points though the object model concurrently; and aggregate the sigma point propagation results to form the updated probability density function.

Example 4. The system of claim 3, wherein time integration of a state of each of the sigma points is independent and in parallel.

Example 5. The system of claim 2, wherein the elastoplastic deformation penalty term is based on plastic and elastic deformations of the object model weighted by respective scaling factors.

Example 6. The system of claim 2, wherein the elastoplastic deformation penalty term factors in uncertainty in the simulated manipulation action.

Example 7. The system of claim 2, wherein the instructions further to cause the at least one processor to: accept the simulated manipulation action if the determined quality metric is greater than a predetermined quality metric threshold.

Example 8. The system of claim 2, wherein the instructions further to cause the at least one processor to: perform a plurality of the simulations and quality metric determinations in parallel or in sequence; and determine a simulated manipulation action having a highest quality metric.

Example 9. The system of claim 2, wherein the manipulation action is one of a plurality of manipulation actions, and prior to the simulation, the instructions further to cause the at least one processor to: perform a constraint check on the plurality of manipulation actions; and filter out any of the plurality of manipulation actions that fail the constraint check.

Example 10. The system of claim 9, wherein the constraint check comprises a plurality of sequentially-performed constraint checks.

Example 11. The system of claim 9, wherein the constraint check comprises a constraint check selected from a group of constraint checks consisting of: a broad reachability constraint check of whether any of the plurality of manipulation actions would result in a robot performing the manipulation action moving outside a defined workspace; a direction/angle constraint check of whether any of the plurality of manipulation actions would result in a direction/angle of movement by the robot being outside a threshold direction/angle range; a kinematically reachable constraint check of whether any of the plurality of manipulation actions would result in a position required by the robot to perform the manipulation action to be unreachable; and a dynamically reachable constraint check of whether any of the plurality of manipulation actions would result in a collision.

Example 12. The system of claim 2, wherein the object material parameters comprise density, plasticity, or relate to material phase transitioning.

Example 13. The system of claim 2, wherein if the random variables potentially have both positive and negative values, the he probability density function is a normal distribution, and if the random variable have non-negative values only, the probability density function is a gamma distribution.

Example 14. A non-transitory computer-readable storage medium of a robotic manipulation planning system, including instructions that, when executed by the at least one processor, cause the at least one processor to: process perception data to detect known, familiar, and unknown objects to generate manipulation candidates; filter manipulation candidates against constraints to reduce the manipulation candidates; and determine quality metrics for the reduced manipulation candidates using a soft-body simulation technique.

Example 15. The non-transitory computer-readable storage medium of claim 14, wherein the determining quality metrics using a soft-body simulation technique comprises: simulating a manipulation action on an object model using a probabilistic material point method (PMPM) based on object material parameters modelled by random variables distributed by a probability density function with sigma points, wherein the sigma points are propagated through the object model to update the probability density function; and determining a quality metric of the simulated manipulation action based on the updated probability density function, wherein the quality metric is a function of an elastoplastic deformation penalty term accounting for deformation of the object model.

Example 16. The non-transitory computer-readable storage medium of claim 15, wherein the instructions further to cause the at least one processor to: propagate the sigma points though the object model concurrently; and aggregate the sigma point propagation results to form the updated probability density function.

Example 17. The non-transitory computer-readable storage medium of claim 16, wherein time integration of a state of each of the sigma points is independent and in parallel or in sequence.

Example 18. The non-transitory computer-readable storage medium of claim 15, wherein the elastoplastic deformation penalty term is based on plastic and elastic deformations of the object model weighted by respective scaling factors.

Example 19. The non-transitory computer-readable storage medium of claim 15, wherein the elastoplastic deformation penalty term factors in uncertainty in the simulated manipulation action.

Example 20. The non-transitory computer-readable storage medium of claim 15, wherein the instructions further to cause the at least one processor to: accept the simulated manipulation action if the determined quality metric is greater than a predetermined quality metric threshold.

Example 21. The non-transitory computer-readable storage medium of claim 15, wherein the instructions further to cause the at least one processor to: perform a plurality of the simulations and quality metric determinations in parallel or in sequence; and determine a simulated manipulation action having a highest quality metric.

Example 22. The non-transitory computer-readable storage medium of claim 15, wherein the manipulation action is one of a plurality of manipulation actions, and prior to the simulating step, the instructions further to cause the at least one processor to: perform a constraint check on the plurality of manipulation actions; and filter out any of the plurality of manipulation actions that fail the constraint check.

Example 23. The non-transitory computer-readable storage medium of claim 22, wherein the instructions further to cause the at least one processor to: perform a plurality of sequentially-performed constraint checks.

Example 24. The non-transitory computer-readable storage medium of claim 22, wherein the constraint check is selected from the group of constraint checks consisting of: a broad reachability constraint check of whether any of the plurality of manipulation actions would result in a robot performing the manipulation action moving outside a defined workspace; a direction/angle constraint check of whether any of the plurality of manipulation actions would result in a direction/angle of movement by the robot being outside a threshold direction/angle range; a kinematically reachable constraint check of whether any of the plurality of manipulation actions would result in a position required by the robot to perform the manipulation action to be unreachable; and a dynamically reachable constraint check of whether any of the plurality of manipulation actions would result in a collision.

Example 25. A robotic manipulation planning system, comprising: a processing means for processing perception data to detect known, familiar, and unknown objects to generate manipulation candidates; a filtering means for filtering manipulation candidates against constraints to reduce the manipulation candidates; and a determining means for determining quality metrics for the reduced manipulation candidates using a soft-body simulation technique.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A robotic manipulation planning system, comprising:
at least one processor; and a non-transitory computer-readable storage medium including instructions that, when executed by the at least one processor, cause the at least one processor to:
process perception data to detect known, familiar, and unknown objects to generate manipulation candidates;
filter manipulation candidates against constraints to reduce the manipulation candidates; and
determine quality metrics for the reduced manipulation candidates using a soft-body simulation technique, wherein the determining the quality metrics using the soft-body simulation technique comprises:
simulating a manipulation action on an object model using a probabilistic material point method (PMPM) based on object material parameters modelled by random variables distributed by a probability density function with sigma points, wherein the sigma points are propagated through the object model to update the probability density function; and
determining a quality metric of the simulated manipulation action based on the updated probability density function, wherein the quality metric is a function of an elastoplastic deformation penalty term accounting for deformation of the object model.

2. The robotic manipulation planning system of claim 1, wherein the instructions further to cause the at least one processor to:
propagate the sigma points though the object model concurrently; and
aggregate the sigma points propagation results to form the updated probability density function.

3. The robotic manipulation planning system of claim 2, wherein time integration of a state of each of the sigma points is independent and in parallel.

4. The robotic manipulation planning system of claim 1, wherein the elastoplastic deformation penalty term is based on plastic and elastic deformations of the object model weighted by respective scaling factors.

5. The robotic manipulation planning system of claim 1, wherein the elastoplastic deformation penalty term factors in uncertainty in the simulated manipulation action.

6. The robotic manipulation planning system of claim 1, wherein the instructions further to cause the at least one processor to:
accept the simulated manipulation action if the determined quality metric is greater than a predetermined quality metric threshold.

7. The robotic manipulation planning system of claim 1, wherein the instructions further to cause the at least one processor to:
perform a plurality of the simulations and quality metric determinations in parallel or in sequence; and
determine the simulated manipulation action having a highest quality metric.

8. The robotic manipulation planning system of claim 1, wherein the manipulation action is one of a plurality of manipulation actions, and prior to the simulation, the instructions further to cause the at least one processor to:
perform a constraint check on the plurality of manipulation actions; and
filter out any of the plurality of manipulation actions that fail the constraint check.

9. The robotic manipulation planning system of claim 8, wherein the constraint check comprises a plurality of sequentially-performed constraint checks.

10. The robotic manipulation planning system of claim 8, wherein the constraint check comprises a constraint check selected from a group of constraint checks consisting of:
   a broad reachability constraint check of whether any of the plurality of manipulation actions would result in a robot performing the manipulation action moving outside a defined workspace;
   a direction/angle constraint check of whether any of the plurality of manipulation actions would result in a direction/angle of movement by the robot being outside a threshold direction/angle range;
   a kinematically reachable constraint check of whether any of the plurality of manipulation actions would result in a position required by the robot to perform the manipulation action to be unreachable; and
   a dynamically reachable constraint check of whether any of the plurality of manipulation actions would result in a collision.

11. The robotic manipulation planning system of claim 1, wherein the object material parameters comprise density, plasticity, or relate to material phase transitioning.

12. The robotic manipulation planning system of claim 1, wherein if the random variables potentially have both positive and negative values, the probability density function is a normal distribution, and if the random variable have non-negative values only, the probability density function is a gamma distribution.

13. A non-transitory computer-readable storage medium of a robotic manipulation planning system, including instructions that, when executed by the at least one processor, cause the at least one processor to:
   process perception data to detect known, familiar, and unknown objects to generate manipulation candidates;
   filter manipulation candidates against constraints to reduce the manipulation candidates; and
   determine quality metrics for the reduced manipulation candidates using a soft-body simulation technique, wherein the determining the quality metrics using the soft-body simulation technique comprises:
   simulating a manipulation action on an object model using a probabilistic material point method (PMPM) based on object material parameters modelled by random variables distributed by a probability density function with sigma points, wherein the sigma points are propagated through the object model to update the probability density function; and
   determining a quality metric of the simulated manipulation action based on the updated probability density function, wherein the quality metric is a function of an elastoplastic deformation penalty term accounting for deformation of the object model.

14. The non-transitory computer-readable storage medium of claim 13, wherein the instructions further to cause the at least one processor to:
   propagate the sigma points though the object model concurrently; and
   aggregate the sigma points propagation results to form the updated probability density function.

15. The non-transitory computer-readable storage medium of claim 14, wherein time integration of a state of each of the sigma points is independent and in parallel or in sequence.

16. The non-transitory computer-readable storage medium of claim 13, wherein the elastoplastic deformation penalty term is based on plastic and elastic deformations of the object model weighted by respective scaling factors.

17. The non-transitory computer-readable storage medium of claim 13, wherein the elastoplastic deformation penalty term factors in uncertainty in the simulated manipulation action.

18. The non-transitory computer-readable storage medium of claim 13, wherein the instructions further to cause the at least one processor to:
   accept the simulated manipulation action if the determined quality metric is greater than a predetermined quality metric threshold.

19. The non-transitory computer-readable storage medium of claim 13,
   wherein the instructions further to cause the at least one processor to:
   perform a plurality of the simulations and quality metric determinations in parallel or in sequence; and
   determine the simulated manipulation action having a highest quality metric.

20. The non-transitory computer-readable storage medium of claim 13, wherein the manipulation action is one of a plurality of manipulation actions, and prior to the simulating step, the instructions further to cause the at least one processor to:
   perform a constraint check on the plurality of manipulation actions; and
   filter out any of the plurality of manipulation actions that fail the constraint check.

21. The non-transitory computer-readable storage medium of claim 20, wherein the instructions further to cause the at least one processor to:
   perform a plurality of sequentially-performed constraint checks.

22. The non-transitory computer-readable storage medium of claim 20, wherein the constraint check is selected from a group of constraint checks consisting of:
   a broad reachability constraint check of whether any of the plurality of manipulation actions would result in a robot performing the manipulation action moving outside a defined workspace;
   a direction/angle constraint check of whether any of the plurality of manipulation actions would result in a direction/angle of movement by the robot being outside a threshold direction/angle range;
   a kinematically reachable constraint check of whether any of the plurality of manipulation actions would result in a position required by the robot to perform the manipulation action to be unreachable; and
   a dynamically reachable constraint check of whether any of the plurality of manipulation actions would result in a collision.

23. A robotic manipulation planning system, comprising:
   a processing means for processing perception data to detect known, familiar, and unknown objects to generate manipulation candidates;
   a filtering means for filtering manipulation candidates against constraints to reduce the manipulation candidates; and
   a determining means for determining quality metrics for the reduced manipulation candidates using a soft-body simulation technique, wherein the determining means determines the quality metrics using the soft-body simulation technique by:
   simulating a manipulation action on an object model using a probabilistic material point method (PMPM) based on object material parameters modelled by random variables distributed by a probability density function with sigma points, wherein the sigma points are propagated through the object model to update the probability density function; and determining a quality metric of the simulated manipulation action based on the updated probability density function, wherein the quality metric is a function of an elastoplastic deformation penalty term accounting for deformation of the object model.

* * * * *